United States Patent [19]

Bronstert et al.

[11] Patent Number: 5,753,777
[45] Date of Patent: May 19, 1998

[54] TELECHELICS CONTAINING ETHANOLAMINE OR OLIGOETHER-OL-AMINE END GROUPS AND PROCESS FOR THE PREPARATION THEREOF

[75] Inventors: Klaus Bronstert, Carlsberg; Konrad Knoll, Mannheim, both of Germany

[73] Assignee: BASF Aktiengesellschaft, Ludwigshafen, Germany

[21] Appl. No.: 553,664

[22] PCT Filed: Jun. 3, 1994

[86] PCT No.: PCT/EP94/01802

§ 371 Date: Nov. 17, 1995

§ 102(e) Date: Nov. 17, 1995

[87] PCT Pub. No.: WO94/29354

PCT Pub. Date: Dec. 22, 1994

[30] Foreign Application Priority Data

Jun. 16, 1993 [DE] Germany .................... 43 19 954.2

[51] Int. Cl.[6] .................... C08F 136/06; C08F 136/08; C08F 8/32
[52] U.S. Cl. .................... 525/332.9; 502/157; 525/333.1; 525/333.2; 525/333.3; 525/333.6; 525/379; 525/385; 526/173; 526/174
[58] Field of Search .................... 526/173, 174; 525/332.9, 333.6, 379, 385, 333.2; 502/157

[56] References Cited

U.S. PATENT DOCUMENTS

| | | | |
|---|---|---|---|
| 4,822,530 | 4/1989 | Bronstert | 502/157 |
| 4,861,742 | 8/1989 | Bronstert | 502/157 |
| 5,112,920 | 5/1992 | Haag | 525/294 |

*Primary Examiner*—Fred Zitomer
*Attorney, Agent, or Firm*—Keil & Weinkauf

[57] ABSTRACT

A polydiene which is obtainable by anionic polymerization of a diene using a bifunctional Li initiator followed by polymer-like reaction and which contains at least one ethanolamine or oligoetherolamine terminal group of the general structure I

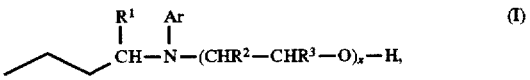

in which
$R^1$ denotes alkyl or aryl,
Ar denotes aryl,
$R^2$ denotes alkyl or hydrogen, and
$R^3$ denotes aryl, alkyl, or hydrogen and
X can assume a value from 1 to 10, and the hydrogenation products thereof.

6 Claims, No Drawings

TELECHELICS CONTAINING ETHANOLAMINE OR OLIGOETHER-OL-AMINE END GROUPS AND PROCESS FOR THE PREPARATION THEREOF

Telechelics are polymers whose chain ends contain functional groups, eg, —OH, —SH, —NH2, etc. They can serve as building blocks for reaction polymers such as polyurethanes, polyepoxides, polyesters etc, polymers functionalized at both ends of the chain being particularly significant.

The process involving anionic polymerization of, eg, butadiene or isoprene using, in particular, bifunctional dilithium initiators in hydrocarbons is particularly suitable for the synthesis of diene telechelics. It yields living polymers of narrow molecular weight distribution and having a suitable microstructure, since a large proportion of the dienes is present in 1,4 configuration. Suitable initiators are also known (eg, EP305,909 (1988), EP363,659 (1989) or EP 405,327 (1990)). The bifunctionally grown living polymers are then converted to the telechelics by a polymer-like reaction with suitable functionalizing agents.

Particularly desirable telechelics are those having terminal primary or secondary hydroxyl groups, which are prepared, in a preferred process (cf, eg, U.S. Pat. No. 3,786,116) by the reaction of the living polymers with epoxides, eg, ethylene oxide or propylene oxide.

During the conversion of the (less polar) Li-organic terminal groups in strongly polar Li alcoholate terminal groups there are formed very stable associates of the chain ends, which leads to a drastic rise in viscosity or, in the case of functionalizations which lead to more than 40–50% of bifunctional species, produces gelation of the reaction mixture as a result of physical cross-linking. Due to the high reaction rate gelation starts almost immediately after the addition of the terminating agent, which prevents uniform mixing thereof. The consequence is an incomplete reaction and loss of quality of the telechelics, possibly also blocking of the stirrer or even damage to parts of the plant. Although it is possible to carry out the termination at low concentrations, such a procedure is uneconomical. There has thus been the need for a process which makes it possible to effect termination with the formation of hydroxyl end groups without these drawbacks.

This is achieved, according to the invention, by causing a living polydiene which is lithium-organically substituted at least one chain end to react first of all with a corresponding aldimine of the general formula II

$$R^1\text{--}CH\text{=}N\text{--}Ar \qquad (II)$$

and then, optionally following hydrolysis and isolation of an intermediate, with an epoxide of the general formula III

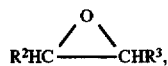

(III)

in which $R^1$, $R^2$, and $R^3$ and Ar have the meanings given below. The invention mainly relates to a polydiene or copolydiene which is obtainable by anionic polymerization of a diene using a bifunctional Li initiator followed by polymer-like reaction, and which contains at least one ethanolamine or oligoetherolamine terminal group of the general structure I

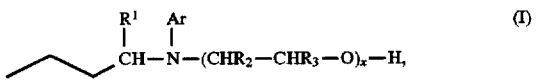

in which
$R^1$ denotes alkyl or aryl,
Ar denotes aryl,
$R^2$ denotes alkyl or hydrogen, and
$R^3$ denotes aryl, alkyl, or hydrogen and
X can assume a value from 1 to 10,
and the hydrogenation products thereof.

In the first reaction step, which is known per se (R. Koenig, G. Riess, A. Banderet, Europ. Polym. J. 3723 (1967)), preferably aldimines of aromatic amines, eg, of aniline are used, aldimines derived from an aromatic amine and an aromatic aldehyde, eg, benzanilide being more preferred.

The telechelics having secondary aromatic amino groups at the chain end, as formed in the initial reaction stage, are in themselves of minor industrial significance on account of their low reactivity.

Thus no amine number can be measured, eg, when using the usual standard method (reaction with phthalic anhydride, saponification), whilst on the other hand, however, no association, accompanied by gelation of the reaction mixture, is observed.

The chemical addition takes place more slowly than the direct reaction of the dilithium polymer with epoxide, so that adequate time is available for homogeneous thorough mixing of the reactants. Since gelation only occurs at a very high functionalization yield and with considerable time-lag, the reaction is easy to control from a process engineering point of view.

The reaction of the isolated, alkali-free polymer containing secondary aromatic amino groups with ethylene oxide (EO) in homogeneous phase in the presence of water as catalyst, optionally together with some acid, takes place more evenly and is without any gelation when carried out in a solvent which dissolves all of the reactants, eg, THF. In this solvent the reaction, carried out at, say, 120° C., is complete after 4 hours, during which process 1 mole of EO is added to each chain end. However, since this procedure requires an additional process step, is it less preferred.

The telechelics of the invention can be copolymers, ie they can contain polymerized units of styrene or α-methylstyrene, advantageously not more than approximately 50 mol %, in addition to dienes. The telechelics of the invention can furthermore be hydrogenated. The hydrogenation with molecular hydrogen and suitable hydrogenation catalysts is described, eg, in U.S. Pat. No. 3,113,986, DE-A 1,222,266, DE-A 2,013,263, DE-A 1,106,961 or DE-A 1,595,345.

Polymers produced by the process of the invention and functionalized with hydroxyl groups at both ends of the chain are of special interest, inter alia, as a prepolymer for polyurethanes, epoxy resins or for modification thereof compared with telechelics that contain only OH groups and no amine groups, they show increased reactivity.

The preparation, eg, of epoxy resins or of elastomeric polyurethanes from a "hard segment" comprising aromatic polyisocyanates and a "soft segment" comprising functionalized flexible macromolecules is described, eg, in H. P. Elias, Makromolekuele, pp. 778–780 and 809–812, Edition Heidelberg/New York (1981) and in the literature cited therein.

The polymers functionalized in the manner proposed in the present invention can be very easily cross-linked with, eg. diisocyanates and other agents. Solutions of such polybutadienes, mixed with diisocyanates, poured on to siliconized paper, and dried, yield in the case of polymers which are predominantly composed of dienes elastic, dry films which are insoluble in hydrocarbons and which can be peeled from the substrate and have a high reversible extensibility.

Polybutadiene diols used as "soft segments" in thermoplastic polyurethanes are distinguished by particularly good separation of "hard segments" from the "soft segments", as is desirable for application and process engineering reasons, as has been described by Becker and Braun, Kunststoffhandbuch, Munich-Vienna.

For a given molecular weight (weight average M $\overline{M}_w$), the telechelic diols produced in accordance with the invention show, on account of their narrow molecular weight distribution, a lower viscosity than known prepolymers, such as polybutadiene telechelics, polytetrahydrofuran or polyesters prepared by free radical polymerization. Thus they are easier to process.

The telechelics produced by the process of the invention can have an average molecular weight (weight average M $\overline{M}_w$) between, eg. 1000 and 500.000, preferably 2.000 and 10.000, as determined by gel permeation chromatography (GPC) and comparison with standardized polymers suitable for calibration purposes (cf G. Gloeckner, Polymercharakterisierung durch Flüssigkeitschromatographie, Heidelberg (1982)).

In the standard method, the sample is measured in a 0.25% strength tetrahydrofuran solution at 23° C. and at a flow velocity of 1.2 mL/min. the molecular weight is advantageously determined prior to functionalization, since some functionalized polymers are irreversibly adsorbed by GPC columns and thus render them unusable.

Polymers suitable for the process of the invention and having a high content of living bifunctional Li polymers can be particularly well prepared by the two-stage polymerization process described in DE 4,030,400.

EXAMPLE 1

An initiator was used which had been produced by dimerization of 1 mol of 1-phenyl-1-(3,4-dimethylphenyl) ethylene with granulated lithium in a mixture of 3 moles each of diethyl ether and ethylbenzene at a temperature below 35° C.

After the reaction, the ether and ethylbenzene were removed by distillation below 30° C. until the ether content had sunk to <0.4 mol per mole of diphenylethylene and an initiator concentration of 1 mol/L had been achieved. The catalyst must be used directly after its preparation, since it begins to crystallize out after a few hours.

The polymerization experiments were carried out in a cylindrical jacketed reactor having a capacity of 6 L, a height of 40 cm, and a diameter of 15 cm. The reactor was equipped with a blade stirrer rotating at a distance from the internal surface of the reactor of 5 mm, so that no unstirred zones occurred. The blades were set in the region of the interior surface of the reactor at an angle of 300° to the horizontal to cause upward pressure and in the center (60% of the diameter) at an angle of 290° to afford downward pressure. A suitable drive is a high-torque air compressor. The reactor jacket was capable of being cooled down to −10°C. or heated up to 70° C. On the reactor there were mounted calibrated storage vessels for the diene (butadiene, isoprene), styrene, and cyclohexane. On the storage vessel for diene there was a brine-filled condenser, through which unconverted butadiene could be recovered from the reactor by distillation and passed into the receiver.

All of the operations required for the preparation of the telechelics were carried out with strict exclusion of oxygen and moisture. The reactor was purged prior to startup with a boiling solution of Li-butyl/diphenylethylene in hexane. Solvents, monomers and ethylene oxide were purified by distillation over aluminum trisobutyl, and the solvent was additionally titrated with the catalyst solution in the storage vessel until a pale orange color remained.

To prepare the telechelics, the reactor was cooled to −10° C. and filled with 300 cm$^3$ of butadiene or isoprene, after which 154 m$^3$ of the 1M catalyst solution were added. Following a period of from 40 to 90 minutes near the boiling point of the monomers, the color of the mixture had turned from dark brown to clear pale orange to dark yellow.

The solution, having become viscous, was then slowly heated to 60° C. with thorough stirring and the addition of cyclohexane, during which process, when use was made of butadiene, part of the monomer was recycled to the receiver by distillation. At 60° C. there were added continuously the residual monomer, at the rate at which it was consumed, in all 700 g (equal to 1.12 L of butadiene or 1.03 L of isoprene), and 4.25 L cyclohexane.

To effect funktionalization, 67 g of benzanilide (2.4 mol per mole of initiator) were mixed into the polymer solution at a temperature of <40° C. with vigorous stirring in ca 2s.

The viscosity rose steeply, but no gel was formed. Stirring was continued for 1 h and then the contents of the reactor were divided; one half of the contents of the reactor was drawn off and, for purification, vigorously mixed with approximately 20% of absolute methanol, based on the volume of the solution. After switching off the stirrer and allowing the phases to separate completely the lower layer of solvent was drawn off. After one or two repetitions of this operation the polymer solution contained less than 1 ppm of alkali. Distilled water, with which the solution was shaken for safety reasons, shows a neutral reaction. Following the addition of 0.1% of a commercial stabilizer (Irganox 1076 (Ciba-Geigy)) the cyclohexane was removed by distillation in vacuo. There was formed a clear, slightly colored material.

Reaction with ethylene oxide

Method 1

200 g of the polymeric material are dissolved in 670 cm$^3$ of THF and 14 cm$^3$ of water are added, transferred to an autoclave having a capacity of 1 L and cooled to 0° C. Following purging with nitrogen and the addition of 150 cm$^3$ of a 1M solution of EO in THF (equivalent to 6.6 g or ca 4 mol of EO per mole of polymer) the autoclave is closed and heated for 4 hours at 120° C.

To effect purification, the polymer is precipitated with 2 L of methanol, washed with 1 L of methanol with stirring and freed from adhering methanol at 100° C. in vacuo, finally at 1 mbar.

Method 2

The residual solution of the polymer which has been reacted with benzanilide and is still present in the polymerization reactor is cooled to approximately 10° C. and 13.6 g of ethylene oxide (ca 4 mol per mole of polymer) are added with vigorous stirring. After 1 h, purification is carried as previously described for the first half of the product.

The nitrogen content was determined by the Kjeldahl method.

The OH number was determined with phthalic anhydride according to a modified specification similar to DIN 53,240, 30 cm³ n-heptane being added after the reaction (prior to titration).

Since determination of the functionality from the molecular weight and OH number or amine number gives only a statistical mean, the content of oligomers having various functionalities on the telechelics was determined by HPLC-analysis.

OH-terminated telechelics were separated under the following conditions into non-functionalized, monofunctional, and bifunctional portions:

column: ®LiChrosorb ON (5 μm), Merck, Darmstadt solvent pair: A=cyclohexane/B=methylene chloride gradient: changing from 100% of A to 58% of B+42% of A over a period of 30 min throughput rate: 1 mL/min detector: mass detector Zinsser Analytik, Frankfurt, Model 750/14

The benzanilide-terminated telechelics were separated using a LiChrosorb-NR2 column, 5 μm, 240×4 mm, under the same conditions.

The sharply defined surfaces of the three components were evaluated, of which the non-functionalized portion was registered first, followed by the monofunctional portion and finally the bifunctional telechelic.

EXAMPLE 2

Preparation of an acetanilide-terminated polyisoprene

An acetanilide-terminated polyisoprene having the target molecular weight of 5778, of which 5000=86.5% diene moiety, was prepared as specified.

The nitrogen content was found to be 0.52%, indicating an equivalent weight of 2693 (theory 2889).

During the HPLC test the product passes through the LiChrosorb CN columns almost without retention. Using the column LiChrosorb-NR$_2$, (5 mm) suitable for the analysis of amines, a uniform peak after 9.9 minutes retention time is obtained, which points to a high functionalization yield.

Reaction with ethylene oxide in THF as specified under method 1

The HPLC analysis using a LiChrosorb CN column yielded after one hour a conversion of 89% (retention time of the target product ca 9.5 minutes). The unconverted portion appeared after ca 3.7 minutes of the elution time of the starting product. After 4 hours, the reaction was complete ( >95%) and the peak of the starting product had disappeared.

OH number (mg of KOH/g), 20.5; indicating an equivalent weight of 2732.

Reaction with ethylene oxide as specified under method 2

The reaction of ethylene oxide (4 mol per mole of polymer) with the Li amide intermediate from the termination with benzanilide takes place less uniformly. The end product contains at least 5 components, some of which probably have polyether structure with elution times ranging from 7 to 20 minutes, F=2>95%.

OH number (mg of KOH/g) 20.2; equivalent weight 2772

EXAMPLE 3

Preparation of an acetanilide-terminated polybutadiene

When acetanilide was added there was only a low rise in viscosity. The polymer had a GPC molecular weight of 5646, a non-uniformity ratio of 1.06 and a nitrogen content of 0.48% (theory 0.5%).

The HPLC (LiChrosorb-NH$_2$, 5 μ column) yielded 4.9% of monofunctional and 95.1% of bifunctional telechelic polymer (elution times 9.5 and 10.5 min respectively). In the HPLC analysis using a LiChrosorb CN column the product was not separated (retention time 3.5 minutes).

Termination of the end product with EO as specified under method 2

Termination was effected in accordance with method 2 but using only 2.4 mol of EO per mole of initiator. Since gelation did not take place until 25s after the addition, homogeneous mixing was possible.

Due to the smaller amount of functionalizing agent the HPLC elugram (LiChrosorb CN column) contained only 3 sharply defined peaks.

| F | 0 | 1 | 2a | 2b |
|---|---|---|---|---|
| % by area | — | 3.4 | 53.4 | 43.2 |
| Elution time [min] | — | 11 | 17 | 21 |

The bifunctional portion (in all 96.6%) was very high. OH number (mg of KOH/g) 20.3; (equivalent weight 2760).

We claim:

1. A telechelic polydiene or copolydiene prepared by:

(a) reaction of an intermediate living polymer prepared by anionic polymerization of a diene using a bifunctional Li initiator, with an aldimine of the formula II,

to form a second intermediate; and (b) then, following an optional hydrolysis and isolation of the second intermediate, reaction of the second intermediate with an epoxide of the formula III,

and which contains at least one ethanolamine or oligoetherolamine terminal group of the structure I

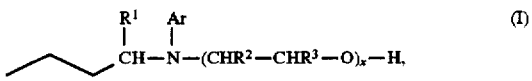

in which

R$^1$ denotes alkyl or aryl,

Ar denotes aryl,

R$^2$ denotes alkyl or hydrogen, and

R$^3$ denotes aryl, alkyl, or hydrogen, and

X can assume a value from 1 to 10, and the hydrogenation products thereof.

2. A process for the preparation of functionalized polydienes as defined in claim 1, wherein a living polydiene which is lithium-organically substituted at least one chain end is first caused to react with an aldimine of the formula II

in which R$^1$ and Ar have the meanings given, and is then, optionally after hydrolysis and isolation of an intermediate, caused to react with an epoxide of the formula III

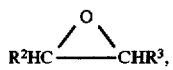 (III)

in which $R^2$ and $R^3$ have the same meanings stated in claim 1.

3. A telechelic as defined in claim 1 and based on butadiene or isoprene.

4. A process as defined in claim 2, wherein the polydiene used is polybutadiene or polyisoprene.

5. A telechelic as defined in claim 1 having a molecular weight $\overline{M}_w$ between 1,000 and 500,000.

6. A telechelic as defined in claim 1 which additionally contains styrene.

* * * * *